Aug. 7, 1962  G. R. GERMAN  3,047,956
INCLINATION AND FLATNESS GAUGE
Filed Feb. 19, 1960  2 Sheets-Sheet 2
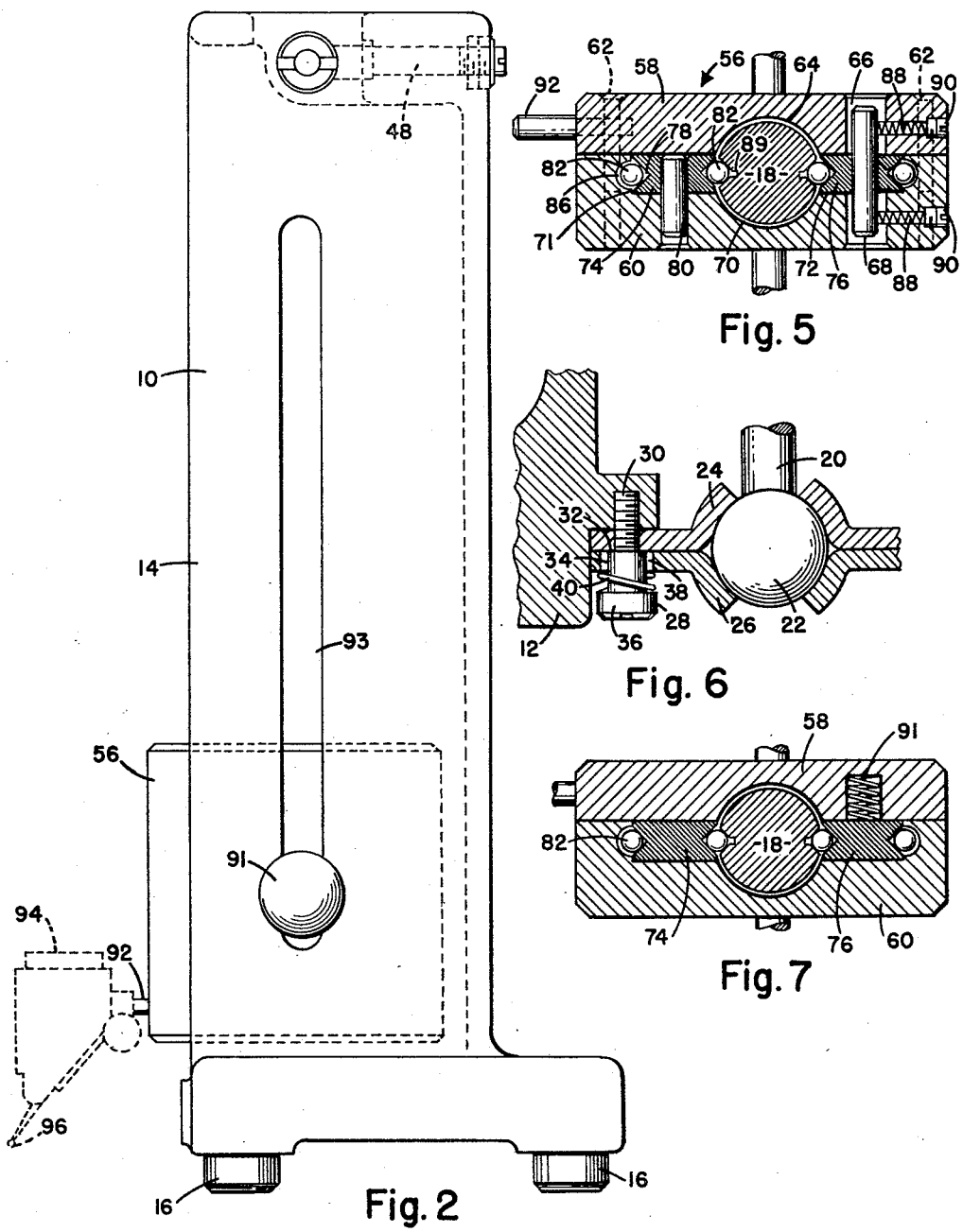
INVENTOR.
GEORGE RAYMOND GERMAN
BY Thomsen & Roenel
ATTORNEYS

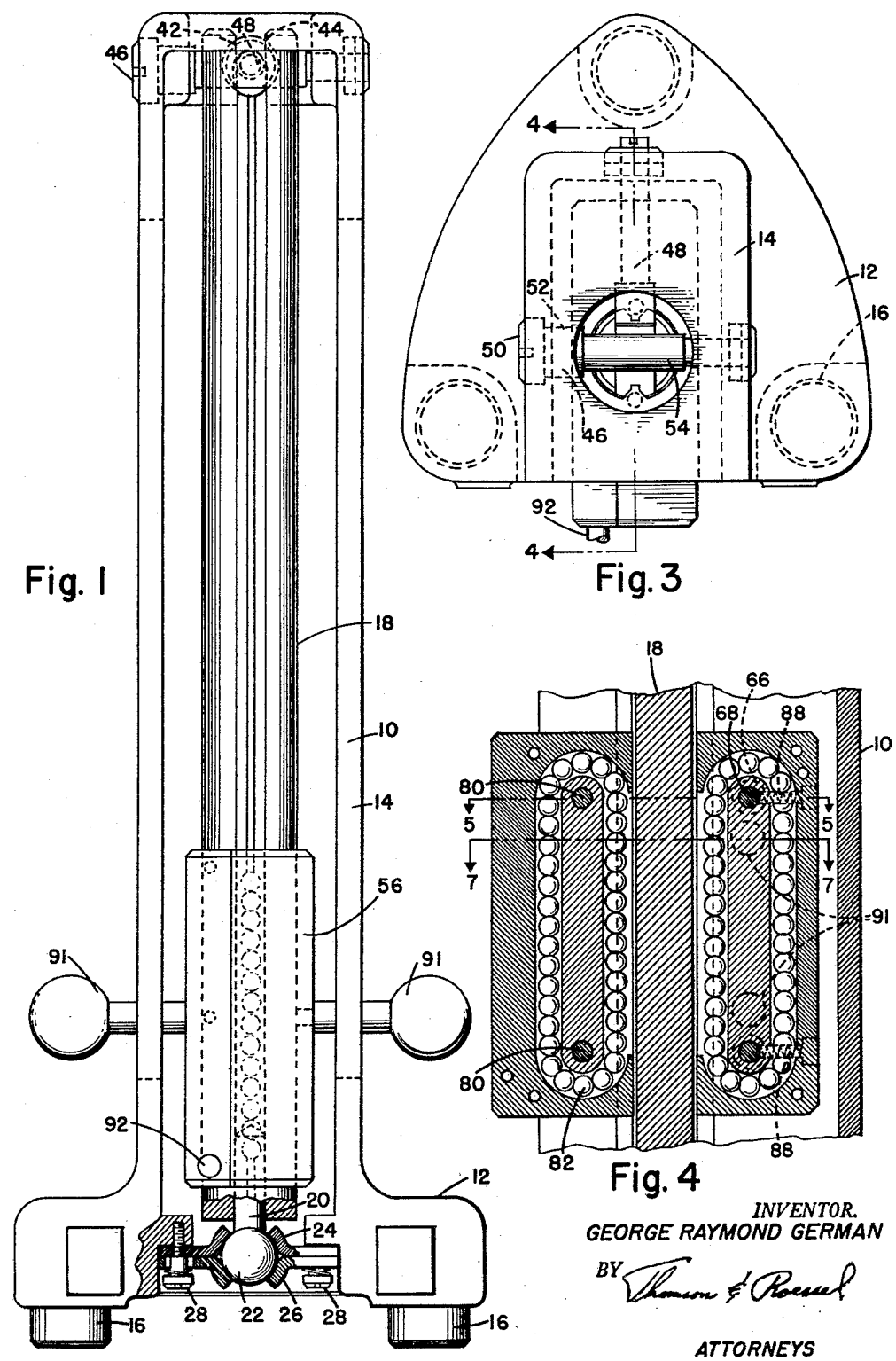

United States Patent Office 3,047,956
Patented Aug. 7, 1962

3,047,956
INCLINATION AND FLATNESS GAUGE
George R. German, 9 Northfield Road, Rochester, N.Y.
Filed Feb. 19, 1960, Ser. No. 9,871
8 Claims. (Cl. 33—174)

This invention relates to the squareness of surfaces with respect to a predetermined plane, and more particularly to a precision instrument for use in machine shops and tool rooms, testing the squareness of surface with respect to flat surface.

For accurate machine work or for the manufacture of tools and dies, it is often necessary to produce surfaces which are flat and square with respect to other surfaces. For this purpose, numerous tools have been used including tool-makers' squares, and other apparatus which may be held against the surface to be tested, and the results are observed by eye. However, it has been found that this method does not afford a precise means for measuring the squareness or flatness of a surface, nor does this provide any quantitative indication of the variation of the surface from the true squareness or flatness desired. For this reason, it is an object of this invention to produce an instrument for quickly and precisely measuring the squareness of a surface with respect to a predetermined plane, and indicating the variation from true squareness on an easily readable dial so that necessary correction or rejection of the part may be made.

Another object of this invention is the provision of an instrument of the above nature which can quickly and easily be set up for use, and yet which is a requisite accuracy for tool and die work.

A further object of this invention is the provision of an instrument of the above description which retains its accuracy indefinitely and is resistant to wear.

A still further object of the above invention is provision of an instrument for measuring the squareness or flatness of a surface, which will give a quantitative indication of the variation of the surface from flatness or squareness.

Another object of this invention is the provision of an intrument which is simple, rapid and reliable in use for the precision inspection of tools, parts, and the like.

Other objects and advantages of my invention will be particularly set forth in the claims and will be apparent from the following description when taken in connection with the accompanying drawings, in which:

FIG. 1 is a front elevational view of the tester partially in section embodying the present invention;

FIG. 2 is a side elevational view of the tester of FIG. 1;

FIG. 3 is a top plan view of the tester of FIG. 1;

FIG. 4 is a fragmentary cross-sectional view of the tester taken substantially along the lines 4—4 of FIG. 3;

FIG. 5 is a cross-sectional view taken substantially along lines 5—5 of FIG. 4;

FIG. 6 is an enlarged fragmentary cross-sectional view of the column support mechanism removed from the apparatus for purposes of clarity; and FIG. 7 is a cross-sectional view taken substantially along lines 7—7 of FIG. 4.

A squareness tester embodying the present invention and herein described for purposes of illustration may be broadly described as comprising an outer frame or casing, a vertical column supported by the casing, a runner which may be freely moved longitudinally on the column, and an indicator fastened to the runner which may be moved longitudinally in a vertical direction while in contact with the surface to be tested for indicating the variation of the surface from the perpendicular.

Referring now to FIG. 1, the frame member 10 comprises an outwardly extending generally triangularly shaped base flange 12 and an upwardly extending casing member 14 having a generally U-shaped cross section and viewed from the top as shown in FIG. 3. Casing 14 and base flange 12 constitute an integral unit which is preferably cast to form a single rigid supporting structure.

Base flange 12 is provided with three downwardly extending feet 16 preferably arranged at the apexes of an equilateral triangle shown in FIG. 3. The bottom surfaces of feet 16 are ground by some means such as a surface grinder to lie in a single plane so that, when set upon a finished surface plate, the entire frame 10 is solidly supported in generally vertical position.

Frame member 10 supports a centrally located cylindrical column 18 (FIG. 1). The lower end of column 18 is supported by means of a downwardly extending extension 20 terminating in a sphere 22, which fits a mating flanged hemispherical seat member 24 fastened to base flange 12. A flanged hemispherical cap member 26 is provided for holding sphere 22 in position in its spherical seat.

In order to assure that sphere 22 is maintained in exact position in seat member 24, cap member 26 is free to move slightly in a sidewise direction and is spring biased in order to force sphere 22 into its seat. This is accomplished by means of a plurality of multi-diameter screws 28 (shown in detail in FIG. 6). Screws have a small threaded shank portion 30 terminating in a shoulder 32. A second larger unthreaded shank portion 34 extends from shoulder 32 to a head 36. Threaded portion 30 is screwed into a suitable threaded hole bored in base flange 12. Shoulder 32 abuts against the flange of seat member 24 holding the same rigidly in position against base flange 12. Unthreaded shank portion 34 extends through a hole 38 in the flange of cap member 26. Head 36 engages in a small single turn coil spring 40, which engages the flange of cap member 26 forcing the same against the spherical seat. Holes 38 in the flange of cap member 26, which are slightly larger than shank portion 34, allows the cap freedom to move in order to accommodate itself to the position of sphere 22. Sphere 22 is thus continuously held against seat member 24, assuring that it maintains its exact concentricity.

The upper end of column 18 is provided with a pair of downwardly extending slots 42 and 44 intersecting each other at right angles as shown in FIG. 1. A pair of adjustmembers 46 and 48 are provided for adjusting the position of the column to a true vertical position. Adjusting member 46 comprises a slotted head 50 (FIG. 3), a cylindrical portion 52 fitting tightly in a suitable hole bored in casing 14 and a second cylindrical portion 54 of smaller diameter whose axis is slightly offset with respect to the axis of cylindrical portion 52 and head 50. Eccentric portion 54 is preferably a slight force fit in slot 44 and serves to hold the top of column 18 rigidly and prevent its moving in a forwardly or backwardly direction. Second adjusting member 48 which extends a short distance into slot 42 (FIG. 3) is identical with member 46 described above with the exception that it is considerably longer so that it may be reached from the rear of casing 14 for adjustment purposes. It may be seen that when member 46 is turned, the rotation of eccentrically mounted cylindrical portion 54 moves the top column 18 in a forwardly and rearwardly direction, and that careful adjustment of the screw makes it possible to set the column with its axis in vertical position in this plane. Similar adjustment of member 48 will move the top of column 18 so that its axis is vertical with respect to the plane of the bottom of feet 16 so that, when the instrument is set on a machined base plate, the axis of column 18 is truly vertical with respect thereto.

A runner 56 is provided for longitudinal movement up and down the column. Runner 56, shown in detail in FIGS. 4 and 5, comprises a pair of flat plate-like members 58 and 60 (FIG. 5) rigidly fastened together by means of machine screws as shown at 62. Plate 58 is routed out as shown at 64 to form a depression of semi-circular cross section to allow for clearance for column 18, and at 66 to allow for clearance for a pair of transversely extending pins 68, the purpose of which will be hereinafter discussed. Plate 60 is also provided with a semi-circular depression 70 for allowing clearance for column 18 and, in addition, contains a pair of rectangular cross-section openings 71 and 72 for receiving ball races 74 and 76 hereinafter described.

Runner 56 is supported for free upward and downward movement on column 18 by means of recirculating balls which are supported by races 74 and 76. Race 74 is located in opening 71 in plate 60 described above. Race 74 comprises a member having straight sides and semi-circular ends (FIG. 4) having a V-shaped groove 78 (FIG. 5) running around its periphery, rigidly held in place in its recess by means of a plurality of pins 80. A plurality of balls 82 is free to move in a circular direction in the passage formed by a V-shaped groove 78 in race 74 and a matching V-shaped groove 89 in column 18 and a semi-circular groove 86 in plate 60.

A second ball race 76 is provided on the other side of column 18. Race 76 is identical to race 74 described above with the exception that it is not rigidly pinned in place. It is held for limited backward and froward movement by pin 68 which is longitudinally movable in holes 66 described above, but is biased toward column 18 (in a left-hand direction as viewed in FIG. 5) by means of a pair of springs 88 abutting against pins 68 and a pair of screws 90 in plates 58 and 60. In order to prevent any sideways play, race 76 is resiliently held against plate 60 by means of a pair of springs 91 (FIGS. 4 and 7) set in recesses in plate 58.

As runner 56 is moved upwardly or downwardly, balls 82 roll on the races described above and provide almost friction-free rolling motion up and down the column. At the same time, the bearings, abutting as they do a flat surface in races 74 and 76 and the carefully machined grooves 84 in column 18 provide very accurate straight line motion. Any wobble or deflection is prevented by the biasing of race 76 against column 18 by means of springs 88 so that any looseness or wear is automatically taken up, and runner 56 moves upwardly and downwardly in true longitudinal motion with a minimum of friction. A pair of handles 91 (FIG. 1) extend outwardly through slots 93 (FIG. 2) in the sides of casing 14 to facilitate vertical movement of runner 56.

Runner 56 is provided with a forwardly extending stud 92 (FIGS. 1 and 5) which is adapted to receive a dial indicator 94 of a type well known in the art. Dial indicator 94 includes an outwardly extending feeler 96 which, by means of an internal multiplying mechanism, actuates a visible pointer which will give indications of movement of the end of feeler 96 in ten thousandths of an inch.

In operation, the testing instrument is set on a highly machined surface plate adjacent to a master square or other suitable vertical reference surface, with the end of feeler 96 in contact therewith. The reading of dial indicator 94 is then noted, and runner 56 is moved upwardly with the feeler in contact with the reference surface and the movement of the pointer of indicator 94 is observed. Should the indicator reading vary as the runner is moved upwardly, it would indicate that column 18 is not truly vertical, and the necessary adjustments can be made by means of members 46 and 48 to bring the column into a true vertical orientation. When the column has been properly adjusted, the reading of indicator 94 should not vary when the runner is moved upwardly and downwardly with feeler 96 in contact with the square reference surface.

Once the instrument has been adjusted with the aid of a reference surface as explained above, it is ready for use. When the operator desires to test the squareness or trueness of any surface, he need merely set the part to be tested on a machined surface plate, set the squareness tester on the plate with the feeler 96 in contact with the surface to be tested, and move runner 56 upwardly and downwardly while observing the movement of the pointer of indicator 94. Any variation in the reading of the pointer on indicator 94 indicates that the surface being tested is not perpendicular to the surface plate. A uniformly increasing reading, for example, will indicate that the surface is sloping away from the instrument; a uniformly decreasing reading would indicate that the surface is sloping toward the instrument. The amount of variation of the surface being tested for perpendicularity is quantitatively indicated by the amount of movement of the pointer of indicator 94 in terms of ten thousandths of an inch. Similarly, an erratic reading of the indicator shows that the surface being tested is not planar; that is, that it waves inwardly and outwardly with respect to the true vertical as defined by column 18.

While an embodiment of the testing instrument has herein been described as being adapted to indicate the perpendicularity of a surface with respect to a reference surface, it is to be understood that the invention is not restricted to such use. It is contemplated that the device would be adapted to test surfaces at any desired angle or could be made adjustable so that it could be set at any desired angle.

It, thus, may be seen that this invention accomplishes its stated objects. A relatively simple but highly accurate means has been provided for measuring the perpendicularity and trueness of surfaces to accuracies to and, in certain cases, even exceeding one ten thousandth of an inch. The device is relatively simple and rugged, and can be adjusted with great precision. The use of recirculating balls not only provides an almost friction free operation of the device, but assures the greatest accuracy since the balls are rolling against planar surfaces which assures linear movement of the runner throughout its entire travel. The spring biasing of the back race assures that the balls abutting the reference surfaces on the front of the column will be in actual contact therewith, and also serves to take up any wear that may occur through protracted use of the tester. Similarly, the spring tension applied to the cap on the ball and socket joint supporting the column assures that the ball will always be truly seated in the spherical socket, irrespective of any movement therein. At the same time, the fact that the adjusting members make a slight force fit with grooves at the top of the column, assures complete contact and absence of any play or motion of the top of the column. Thus, the instrument is so designed that it will retain the accuracy of its setting indefinitely, and long use and wear will have no effect upon the accuracy or ease of operation thereof since all wear is automatically taken up by spring biasing means.

While I have shown and described the preferred form of mechanism of my invention it will be apparent that various modifications and changes may be made therein, particularly in the form and relation of parts, without departing from the spirit of my invention as set forth in the appended claims.

I claim:

1. An instrument for measuring the inclination and flatness of surfaces comprising, in combination, a supporting frame member, an elongated member having longitudinal tracks associated therewith, said elongated member being supported on said frame by a universally movable joint, means on said supporting member for adjusting the inclination of said elongated member to a precisely predetermined angle with respect to a planar surface, a runner longitudinally movable along said column, and means attached to said runner for indicating variations in the surface being tested.

2. An instrument for measuring the inclination and flatness of surfaces comprising, in combination, a supporting frame, a universally movable joint on said frame, an elongated member having a longitudinal track associated therewith and having one end attached to said universally movable joint, said member having openings adjacent the free end thereof, rotatable adjusting members journaled in said frame and having eccentric portions in said slots engaging the inner walls thereof for precisely adjusting the position of the free end of said elongated member, and a runner longitudinally movable along said elongated member.

3. An instrument for measuring the inclination and flatness of surfaces comprising, in combination, a supporting frame member, an elongated member having a longitudinal track associated therewith, one end of said elongated member being supported on said frame by means of a spring-loaded ball and socket joint, the other end of said elongated member having slots formed therein, rotatable adjusting members journaled in said frame and having eccentric portions in said slots engaging the inner sides thereof, and a runner longitudinally movable along said elongated member.

4. An instrument as claimed in claim 3 wherein said slots are slightly smaller than the diameter of the eccentric portions of said adjusting members whereby these portions form a force fit for preventing any play in the free end of said elongated member.

5. An instrument for measuring inclination and flatness of surfaces comprising, in combination, a supporting frame member, adapted to be placed on a planar surface, an elongated member having longitudinally extending substantially V-shaped grooves, a universally movable joint on said frame for supporting one end of said elongated member, the other end of said elongated member having slots cut therein, rotatable adjusting members journaled in said frame and having eccentric portions in said slots engaging the inner walls thereof for precisely adjusting the position of said other end of said elongated member, and a runner longitudinally movable along said elongated member, said runner including a pair of opposed ball races, a plurality of balls adapted to circulate in said races and to run in said V-shaped grooves, one of said races being rigidly fastened to said runner, the other of said races being mounted for limited motion toward and away from said elongated member, and spring means for resiliently urging said movable race toward said elongated member for preventing any play between said runner and said elongated member, and means associated with said runner for indicating variations in the surface being tested.

6. An instrument for measuring the angularity and flatness of surfaces comprising, in combination, a supporting member, an elongated member having a longitudinally extending track, and a runner longitudinally movable along said elongated member, said runner comprising a body member, said body member containing cavities for receiving ball races, a fixed ball race in one of said cavities, a second ball race in the other of said cavities, said second race being mounted for limited motion toward and away from said elongated member, spring means for resiliently urging said second race toward said elongated member and a plurality of balls adapted to circulate in said races and to run in said V-shaped grooves for allowing said runner to move longitudinally on said elongated member.

7. An instrument for measuring the angularity and flatness of surfaces comprising, in combination, a supporting member, an elongated member having a longitudinally extending track, and a runner longitudinally movable along said elongated member, said runner comprising a body member, said body member containing cavities for receiving ball races, a fixed ball race in one of said cavities, a second ball race in the other of said cavities, said second race being mounted for limited motion toward and away from said elongated member and in a sidewise direction at right angles to the axis of said elongated member, spring means for resiliently urging said second race toward said elongated member and second spring means for resiliently urging said second race against one wall of said cavity for preventing sidewise play of said race, and a plurality of balls adapted to circulate in said races and to run in said V-shaped grooves for allowing said runner to move longitudinally on said elongated member.

8. An instrument for measuring the angularity and flatness of surfaces comprising, in combination, a supporting frame member, an elongated member having longitudinally extending substantially V-shaped grooves, means for supporting said elongated member on said frame at a precisely predetermined angle with respect to a planar surface, a runner longitudinally movable along said elongated member, said runner including a pair of opposed ball races and a plurality of balls adapted to circulate in said races and to run in said V-shaped grooves for allowing said runner to move longitudinally on said elongated member, one of said ball races being rigidly fastened to said runner, the other of said ball races being mounted on said runner for limited motion toward and away from said elongated member and is provided with spring means for resiliently urging said race towards said elongated member for preventing play between said runner and said elongated member during longitudinal movement.

References Cited in the file of this patent

UNITED STATES PATENTS

| | | |
|---|---|---|
| 1,491,075 | Batchelor | Apr. 22, 1924 |
| 2,143,237 | Byrnes | Jan. 10, 1939 |
| 2,201,739 | Nicholson | May 21, 1940 |
| 2,338,001 | La Vigne | Dec. 28, 1943 |
| 2,611,968 | Brown | Sept. 30, 1952 |
| 2,787,838 | Tucker | Apr. 9, 1957 |
| 2,827,707 | Croshier et al. | Mar. 25, 1958 |
| 2,929,661 | Brown | Mar. 22, 1960 |
| 2,945,366 | Sears | July 19, 1960 |